United States Patent [19] [11] Patent Number: 4,776,418
Winckler et al. [45] Date of Patent: Oct. 11, 1988

[54] FOUR WHEEL STEERING HAVING CLOSED HYDRAULIC SYSTEM WITH PRESSURE CONTROL ASSEMBLY

[76] Inventors: Peter S. Winckler, 445 Wadsworth La., Birmingham, Mich. 48010; David M. Preston, 29656 Spoon, Madison Heights, Mich. 48071

[21] Appl. No.: 138,784

[22] Filed: Dec. 28, 1987

[51] Int. Cl.[4] .............................................. B62D 5/06
[52] U.S. Cl. ..................................... 180/140; 91/419; 91/437
[58] Field of Search .................. 180/140, 141; 280/91, 280/426, 442, 443, 81.5, DIG. 9; 91/437, 419

[56] References Cited

U.S. PATENT DOCUMENTS

| 2,761,693 | 9/1956 | Stover | 280/442 X |
| 2,832,200 | 4/1958 | Grout | 91/437 X |
| 4,313,514 | 2/1982 | Furukawa et al. | 180/143 |
| 4,621,702 | 11/1986 | Kanazawa et al. | 180/140 |
| 4,646,867 | 3/1987 | Kanazawa et al. | 180/140 |
| 4,666,013 | 5/1987 | Shibahata et al. | 180/141 |
| 4,671,523 | 6/1987 | Naumann | 280/91 |
| 4,697,816 | 10/1987 | Kawamoto et al. | 280/91 |

OTHER PUBLICATIONS

SAE Technical Paper Series 860624—Improvement of Vehicle Dynamics by Vehicle-Speed-Sensing Four-Wheel Steering System—Yasuda, et al.

Hydronic Corporation Brochure—Remote Control System.

Primary Examiner—John A. Pekar

[57] ABSTRACT

A closed hydraulic system (22) is provided for transmitting steering movement to a rear wheel steering assembly (16) in response to steering movement of a front wheel steering assembly (14). The front wheel steering assembly is controlled by a steering wheel (18) and a power steering assembly (20). The closed hydraulic system (22) includes a pump assembly (44) and an actuator assembly (46) connected together by conduits (48,50) to define closed fluid flow branches or fluid links (49,51) for moving a piston (94) in the actuator assembly in response to movement of a piston (72) in the pump assembly. Movement of the actuator piston is transmitted to the rear wheel steering assembly via a cam assembly (92) which effects same direction rear wheel steering for rather small front wheel steering angles and which effects opposite direction rear wheel steering for greater front wheel steering angles. System (22) may include a reservoir assembly (60) including a piston assembly (116) for maintaining a constant positive pressure in both branches, a dash pot (124) for preventing sudden steering angle changes of the rear wheels in the event of rapid fluid loss in either branch, and relief valve assemblies (126,126') for limiting the maximum pressure differential between the branches.

12 Claims, 4 Drawing Sheets

FIG 2
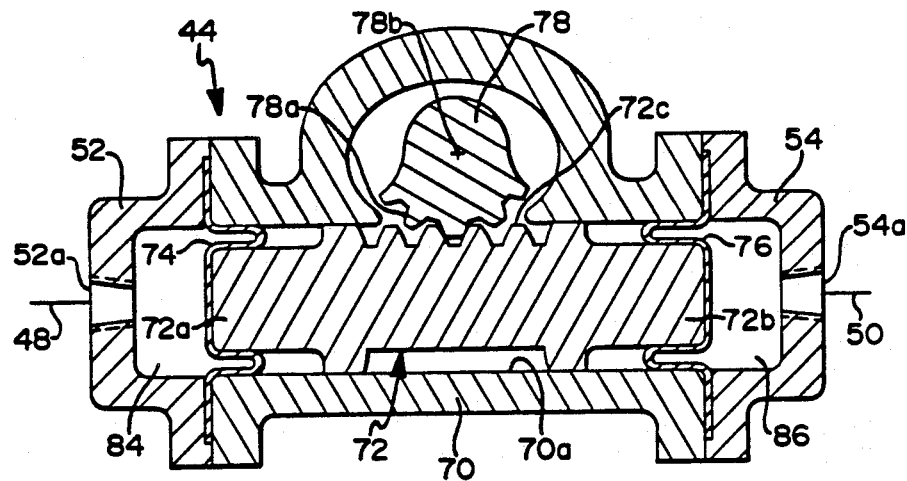
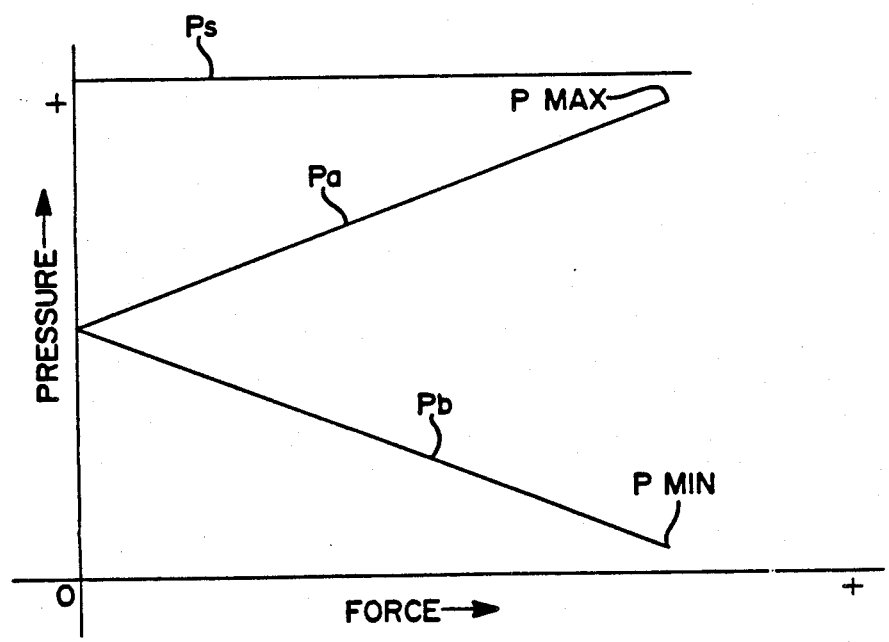
FIG 7

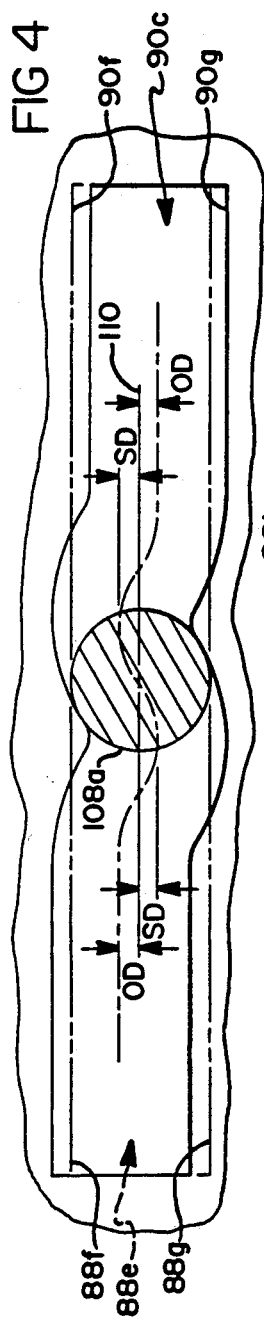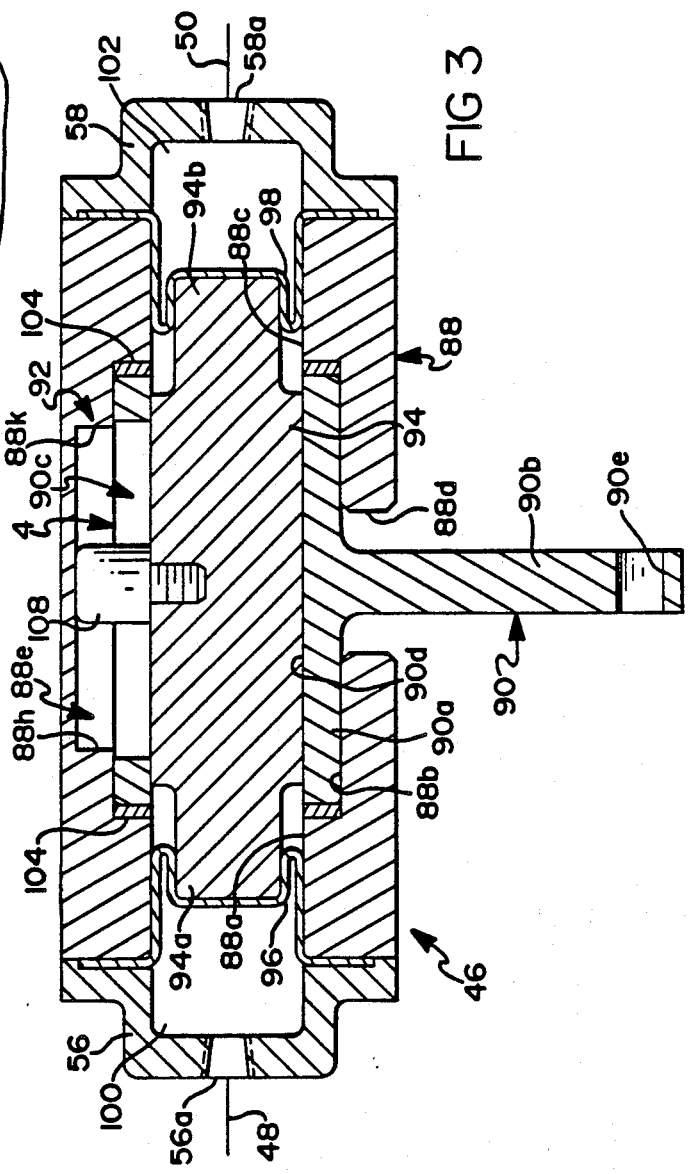

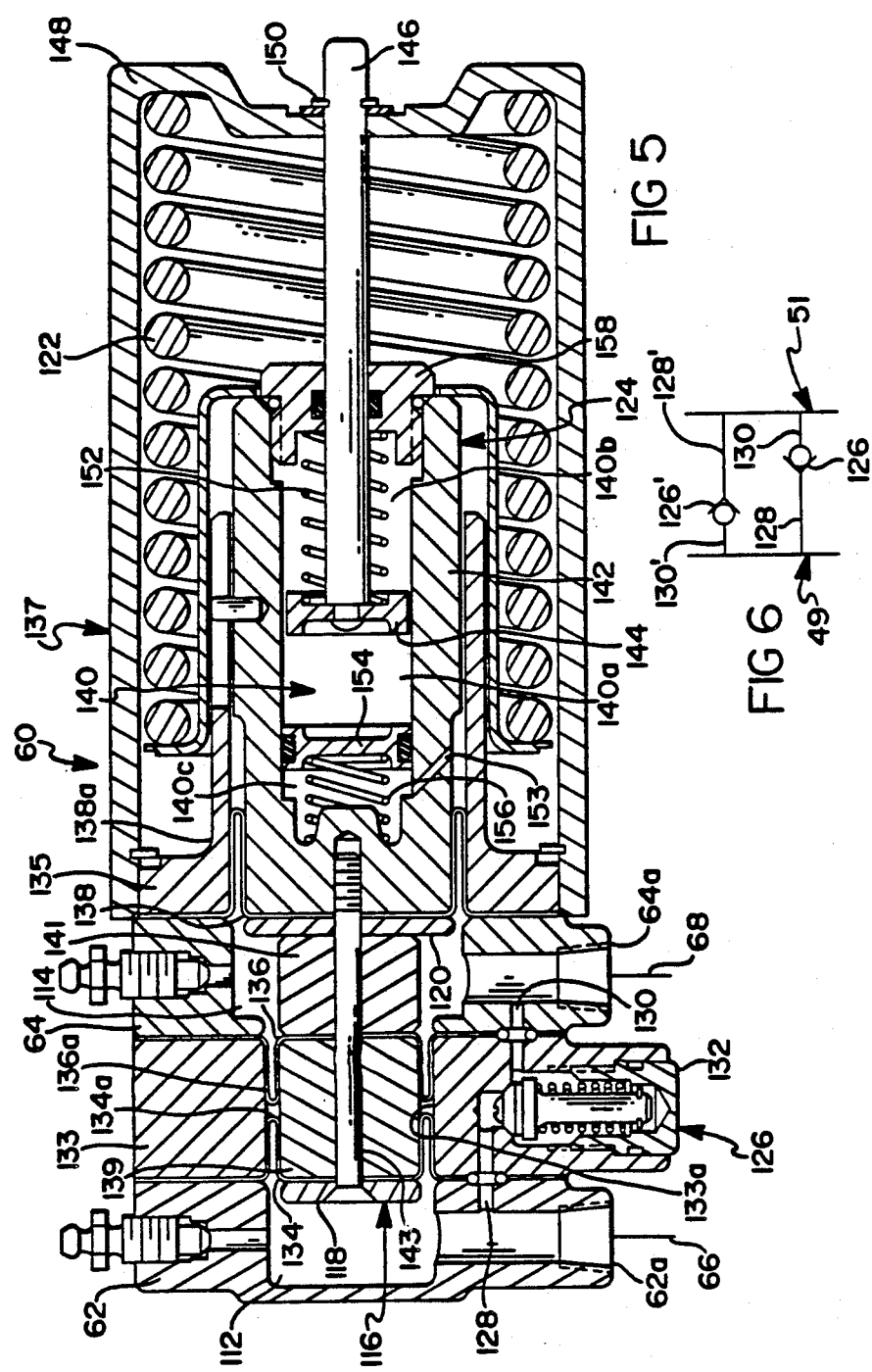

FOUR WHEEL STEERING HAVING CLOSED HYDRAULIC SYSTEM WITH PRESSURE CONTROL ASSEMBLY

FIELD OF INVENTION

The present invention relates to four wheel steering. More specifically, the invention relates to apparatus for transmitting steering movement to a rear wheel steering assembly of a vehicle in response to steering movement of a front wheel steering assembly.

DESCRIPTION OF THE PRIOR ART

The purpose of four wheel steering is of course to reduce vehicle turning radius and/or to improve high speed performance of the vehicle. It is known to employ electrical, electrohydraulic, hydromechanical, or mechanical apparatus to transmit steering movement to rear wheel steering assemblies of vehicles in response to steering movement of front wheel steering assemblies. In practice, implementation of such apparatus has been expensive, has been somewhat unreliable, and/or has provided less than optimum performance. Further, hydromechanical and mechanical apparatus have been difficult to package into available vehicle space and have been difficult to protect against the harsh environment in which vehicles operate.

In a known four wheel steering system, steering movement of a front wheel steering assembly is transmitted to a rear wheel steering assembly via a mechanical apparatus in the form of a rotatably mounted shaft means extending longitudinally of the vehicle between the front and rear wheel steering assemblies. The rotatably mounted shaft means senses steering movement of the front wheel steering assembly and also transmits power for steering the rear wheel steering assembly. It is also known to convert this mechanical apparatus to a hydromechanical apparatus by connecting the output of the rotatably mounted shaft to a valve which ports pressurized hydraulic fluid from a motor driven pump to a power cylinder operative to transmit steering movement to the rear wheel steering assembly. It is also known to provide such mechanical and hydromechanical apparatus with a geared transmission operative to reverse the output direction of the rotatably mounted shaft means when the steering angle of the front wheel steering assembly exceeds a predetermined amount, thereby changing the steering direction of the rear wheels relative to the front wheels from the same direction to opposite direction.

Disclosed herein is a closed hydraulic system having first and second closed fluid branches or links for transmitting steering movement to a rear wheel steering assembly in response to steering movement of a front wheel steering assembly. Such a closed hydraulic system is inexpensive and can in theory provide fluid links without backlash between the front and rear wheel steering assemblies regardless of the length or path of the branches, requires no adjustment during initial installation or subsequent repairs, and also maintains precise positional relationships between the front and rear wheel steering assemblies. In actual practice, a closed hydraulic system could become partially or fully inoperative due to ever minor fluid loss, could cause loss of front wheel steering control in the event of an over pressure condition in either of the closed branches due, for example, to seizure of a mechanical component driver by the system, could be sensitive to fluid volume changes due to temperature, and could cause an abrupt rear wheel steering angle change in the event of rapid fluid loss in either branch.

SUMMARY OF THE INVENTION

An object of this invention is to provide a reservoir assembly having means to control fluid in a closed hydraulic system.

Anther object of this invention is to provide such a reservoir in a closed hydraulic system for transmitting steering movement to a rear wheel steering assembly in response to steering movement of a front wheel steering assembly.

According to a feature of the invention, a hydraulic system includes first and second closed fluid flow branches; a pump device connected to one end of each branch and having pumping means movable to-and-fro about a neutral position for effecting to-and-fro fluid flow in the closed branches in response to to-and-fro movement of the pumping means; an actuator device connected to the other end of each closed branch and having actuating means movable to-and-fro about a neutral position in response to the to-and-fro fluid flow; first and second movable means allowing thermal expansion and contraction of the fluid in both branches. The improvement comprises resilient means continuously biasing the first and second movable means in a direction tending to decrease the fluid volume in the closed branches for maintaining substantially equal positive fluid pressure in both branches when the pumping and actuating means are in their neutral positions.

BRIEF DESCRIPTION OF THE INVENTION

An apparatus according to the present invention is shown in the accompanying drawings in which:

FIGS. 2, 3, 5 and 6 are detailed views of components of the apparatus;

FIG. 4 is an enlarged partial view of a cam slot in the component of FIG. 3 looking in the direction arrow 4 in FIG. 3; and FIG. 7 is a graph of hydraulic system pressure in the apparatus.

DETAILED DESCRIPTION OF THE DRAWINGS

Figure 1:
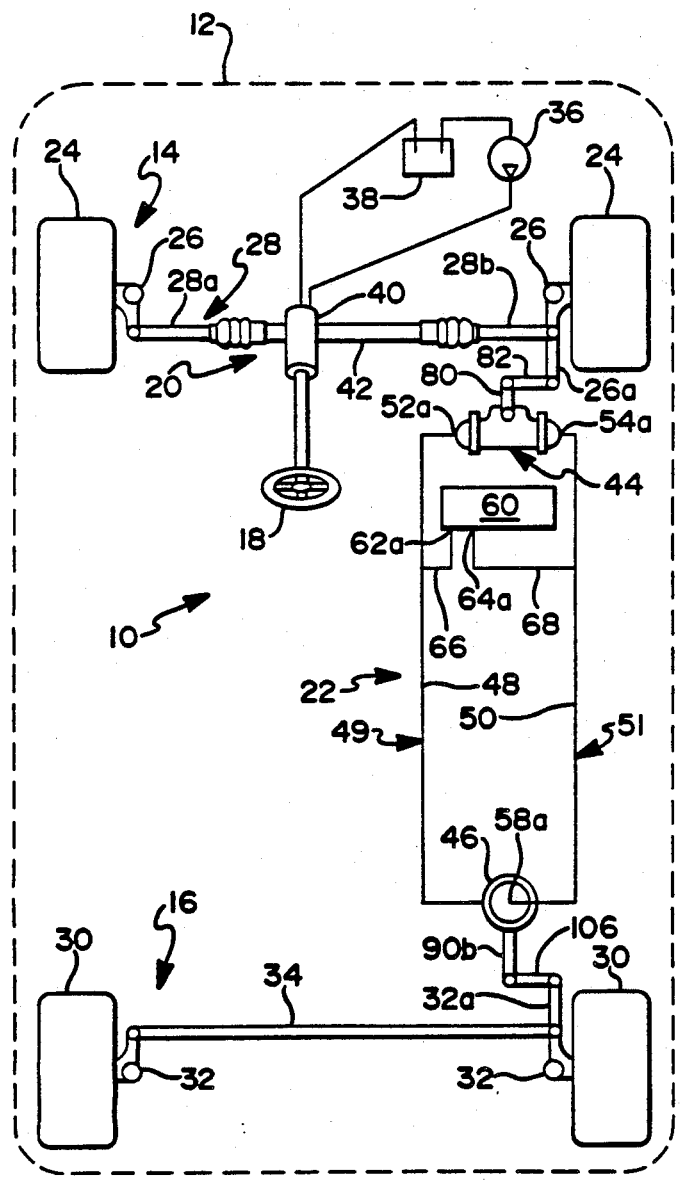
FIG. 1 is a schematic plan view of a vehicle having the apparatus of the invention disposed between front and rear wheel steering assemblies.

The schematic plan view of FIG. 1 illustrates a steering system 10 for a wheeled vehicle having a body represented by phantom line 12, and front and rear steerable wheel assemblies 14, 16. The system includes a steering wheel 18, apparatus or first means 20 for transmitting steering movement of the steering wheel to the front wheel steering assembly, and a closed hydraulic system or second means 22 for transmitting steering movement to the rear wheel steering assembly in response to steering movement of the front wheel steering assembly. Alternatively, the closed hydraulic system may transmit steering movement to a servo valve of a rear wheel power steering assembly as disclosed in co-pending application Ser. No. 138,762, filed Dec. 28, 1987 and incorporated herein by reference.

The front wheel steering assembly 14 includes front wheels 24 each having a steering knuckle arm 26 pivotally connected together by tie rod ends 28a, 28b of a tie rod or ram 28 disposed for to-and-fro movement transverse to the longitudinal direction of the vehicle in known manner. The tie rod or ram 28 forms part of apparatus 20 and is discussed further hereinafter. The rear wheel steering assembly 16 includes rear wheels 30 each having a steering knuckle arm 32 pivotally connected together by a tie rod 34 disposed for to-and-fro movement transverse to the longitudinal direction of the vehicle.

Apparatus 20 may be any of several well known mechanical non-power or power steering assemblies which transmit steering movement to front wheel steering assemblies in response to steering movement of a steering wheel. Apparatus 20 is preferably of the power steering type and, as illustrated therein, is of the well known hydraulic type including a source of pressurized hydraulic oil or fluid provided by a pump 36 in known manner, a sump 38, and a servo valve 40 for connecting or communicating the source and sump with opposite sides of an unshown piston disposed in a power cylinder 42. Tie rod ends 28a, 28b extend from opposite sides of the unshown piston and move together in to-and-fro motion in response to alternate porting or communication of opposite sides of the unshown piston with the source and sump by valve 40.

Closed hydraulic system 22 includes a pump assembly 44 (see FIGS. 1, 2), an actuator assembly 46 (see FIGS. 1, 3, 4), and conduits or passages 48, 50 respectively connected at one end to ports 52a, 54a defined by end caps 52, 54 of the pump assembly and respectively connected at the other end to ports 56a, 58a defined by end caps 56, 58 of the actuator assembly. System 22 may also include a closed reservoir assembly 60 having ports 62a, 64a respectively connected to conduits 48, 50 by conduits or passages 66, 68.

Pump assembly 44 includes a cylinder portion or center housing member 70 defining a cylindrical bore 70a, a piston member or movable means 72 slidably disposed in the bore and having oppositely facing ends 72a, 72b supporting roll type diaphragms 74, 76, the end caps 52, 54, and a pinion 78 having teeth 78a in mesh with rack teeth 72c defined by piston 72. Pinion 78 is supported for rotation by housing member 70 in a conventional manner and is rotated about its axis 78b in response to steering movement of the front wheel steering assembly by a linkage assembly. The linkage assembly includes a rigid extension 26a of steering knuckle arm 26, an arm 80 non-rotatably fixed at one end to pinion 78, and a link 82 pivotally connected at its opposite ends to extension 26a and arm 80. Diaphragms 74, 76 are sealingly sandwiched between the housing and end caps to define volumes 84, 86. The end caps are secured to the housing in known manner, e.g., by unshown screws. Volumes 84, 86 vary inversely in volume in response to sliding movement of the piston due to rotation of pinion 78. Diaphragms 74, 76 hermetically seal the volumes at piston ends 72a, 72b and, in combination with piston 72, provide a movable partition sealingly separating the volumes against fluid communication therebetween.

Actuator assembly 46 includes a housing assembly shown herein for illustration purposes as a one piece housing member 88 having coaxial bore portions 88a, 88b, 88c; an actuating member 90 rotated by a cam assembly 92 in response to sliding movement of a piston or movable means 94, roll type diaphragms 96, 98 supported by oppositely facing ends 94a, 94b of the piston, and the end caps 56, 58. In a manner analogous to pump 44, diaphragms 96, 98 are sealingly sandwiched between the housing and caps 56, 58 to define volumes 100, 102 which vary inversely in volume in response to sliding movement of piston 94. More specifically, volumes 100, 102 vary inversely in volume in response to sliding movement of pump piston 72 and, thereby effect sliding movement of piston 94. The diaphragms also hermetically seal the volumes at the piston ends 94a, 94b and, in combination with piston 94, provide a movable partition sealingly separating volumes 100, 102 against fluid communication therebetween.

Looking now at actuating member 90 and cam assembly 92, member 90 includes a cylindrical portion 90a, supported on its outer surface for lmited to-and-fro rotation by bore portion 88b, an arm portion 90b extending radially from the cylindrical portion and through a circumferentially extending clearance slot 88d in the housing member, and a curved cam slot 90c shown enlarged in the partial view of FIG. 4 with straight cam slot 88e projected thereon in phantom line. Axial movement of the cylindrical portion is prevented by annular thrust bearings 104. A bore 90d in the cylindrical portion 90a and bore portions 88a, 88c of the housing member define a continuous bore for sliding movement of piston 94. An opening 90e in arm portion 90b pivotally connects to a linkage assembly for moving the rear wheel steering assembly through steering angles in response to rotation of actuating member 90. The linkage assembly includes a rigid extension 32a of rear steering knuckle arm 32 and a link 106 pivotally connected at its ends to extension 32a and arm portion 90b.

Conduits 48, 50, pump volumes 84, 86, and actuator volumes 100, 102 define first and second closed fluid flow branches or closed fluid links 49, 51 between the pump and actuator pistons. The branches are filled with a non-compressible oil. Hence sliding movement of pump piston 72 in response to steering movement of the front wheel steering assembly causes fluid flow in both branches and a corresponding sliding movement of actuator piston 94. The pistons move the same amount where the displacement surface areas of their piston ends and diaphragms are the same. Sliding movement of actuator piston 94 may be transmitted directly to effect steering movement of the rear wheel steering assembly or transmitted via actuating member 90 and cam assembly 92.

Cam assembly 92 includes the curved cam slot 90c having oppositely facing curved cam surfaces 90f, 90g defined by the wall of cylindrical portion 90a, a straight cam slot 88e having straight cam surfaces 88f, 88g defined by the wall of housing member 88, and a cam follower 108 extending radially from piston 94. Follower 108 has an outer cylindrical surface 108a of diameter slightly less than the width of cam slots 90c, 88e to allow movement of the follower in the slots and to limit free play. The outer cylindrical surface of follower 108 may be supported by an unshown antifriction bearing or bearings to reduce friction.

Straight slot 88e prevents rotation of piston 94 and cam follower 108 relative to the housing member. Ends 88h, 88k of the straight slot may be used as stops which engage cam follower 108 to limit the range of sliding movement of piston 94. Ideally, follower 108 engages at the same time the front wheels reach their maximum steering angle. Curved slot 90c forces actuating member to rotate in directions and through angles according to its preselected cam profiles. Line 110 in FIG. 4 represents the longitudinal center of straight slot 88e. Dimensions SD and OD represent maximum same and opposite direction steering angles when the follower is moved in either direction from its shown neutral position corresponding to straight ahead steering of the front wheels.

In the disclosed embodiment, the profile of curved cam slot 90c is selected to first rotate actuating member 90 in directions effecting same direction steering of the front and rear wheels and then opposite direction steering in response to increased front wheel steering angles. By way of example, maximum same and opposite direction steering angles are 2 degrees for the disclosed embodiment. However, as may be seen, the profile is readily changed to provide different same and opposite direction steering angles. Further, the profile of curved cam slot 90c may be selected to cause only same direction steering, opposite direction steering, and/or steering angles that are not the same for left and right turns. Alternatively, cam assembly 92 may be disposed between front wheel steering assembly 14 and pump piston and the rear steering linkage may be moved in direct response to movement of actuator piston 94, whereby fluid flows in the closed branches 49, 51 and actuator piston movement will vary according to curved cam profiles 90f, 90g.

Looking now at FIG. 5, closed hydraulic system 22 is preferably provided with reservoir assembly 60 which includes closed reservoir chambers 112, 114 respectively communicating with conduits 48, 50 or branches 49, 51, a piston assembly 116 having circular and annular surfaces 118, 120 facing axially in the same direction and of substantially equal effective area acting on the fluid in chambers 112, 114, a spring 122 biasing the surface areas in direction tending to decrease the volumes of the chambers and therefore applying substantially equal precharge pressures to both branches when no external forces are acting on the pump and/or actuator pistons, and a damper or dash pot like assembly 124 for limiting the rate of movement of piston assembly 116. The purpose of dash pot assembly 124 is to prevent rapid change in the rear wheel steering angle in the event of rapid fluid loss in either of the branches. For convenience sake, the reservoir has incorporated therein two relief valve assemblies 126; 126'. Assembly 126' is shown only in schematic form in FIG. 6. The valve assemblies relieve excess differential pressure between the branches to prevent loss of front wheel steering control due to excessively high pressure in the closed hydraulic system; such pressure could be caused by seizure of movable components associated with the closed hydraulic system. The valve assemblies differ mainly with respect to the position of passages 128, 130 and 128', 130'. Passages 128, 130 are positioned to effect high pressure relief in branch 49 and the passages for 128', 130' are positioned to effect high pressure relief in branch 51. At least one of the valve assemblies includes a threaded member 132 which may be backed out to allow free fluid flow between the branches for repositioning the pumps and/or actuator pistons to their neutral positions after occurrence of an over-pressure condition. Further, member 132 may be used for neutral positioning or centering the pistons during or prior to system installation.

The reservoir chambers 112, 114 are hermetically sealed by three roll type diaphragms 134, 136, 138 having their outer portions respectively sandwiched between housing members 62, 133; 133, 64; and 64, 135. Housing members 62, 133, 64, 135, and 148 define a housing assembly 137 which is rigidly secured together by unshown fasteners such as screws. A through bore 133a in member 133 provides an opening between adjacent open portions of chambers 112, 114. Puck like members 139, 141, a member 142 and the diaphragms are rigidly secured together by a screw 143. Diaphragms 134, 136 and member 139 define a first movable partition disposed in the opening between adjacent open portions of the reservoirs chambers for sealingly separating the reservoirs against fluid communication therebetween. Diaphragm 138 and member 142 define a second movable partition axially spaced from and fixed for movement with the first movable partition for sealing the second opening in chamber 114. The effective surface areas of the circular and annular piston surface areas 118, 120 is substantially determined by the diametrical distance between the midpoints 134a, 136a, 138a of the folds of the respective diaphragms. For circular piston surface 118 the effective surface area is determined merely by the diametrical distance between the fold midpoints 134a. For annular piston surface 128 the effective surface area is determined by the difference of the diametrical distances between the midpoints 138a, 136a of diaphragms 138, 136.

Dash pot assembly 124 includes a cylindrical chamber 140 formed in the member 142 of the piston assembly, a loosely fitting piston 144 dividing the chamber into subchambers 140a, 140b, a rod 146 fixed at one end to piston 144 and secured to the housing member 148 by a snap ring 150 which limits leftward movement of the piston relative to the housing member, a spring 152 biases the piston and rod leftward, and a third subchamber 140c vented to ambient by a passage 153 and sealed from subchamber 140a by a slidable piston 154 biased rightward by a spring 156. Chambers 140a, 140b are filed with a non-compressible viscous fluid such as silicone fluid which extrudes through a restriction defined by the space between piston 144 and the cylinder wall to prevent rapid leftward movement of piston assembly 116. Subchamber 140c facilitates silicone fluid displacement when an end cap 158 is threaded into the open end of cylindrical chamber 140 and also accommodates thermal expansion of the silicone fluid.

The biasing force of reservoir spring 122 acting on the hydraulic oil in branches 49, 51 via piston surface areas 118, 120 maintains the sum of the fluid pressures in the branches substantially constant during non-operational and operational modes of the closed hydraulic system. The graph of FIG. 7 illustrates the hydraulic pressure characteristics in branches 49, 51 as external forces acting on pump and actuator pistons 72, 94 increase from zero in response to steering forces transmitted by front and rear wheel steering assemblies 14, 16. A curve $P_a$ represents the pressure in one branch, a curve $P_b$ represents the pressure in the other branch, and a constant pressure curve $P_s$ represents the sum of the pressures in both branches during all modes of operation. As the forces for maintaining or changing rear wheel steering angles in any direction increase, the pressure in the branch providing the necessary force increases proportionally and the pressure in the other branch decreases proportionally.

As previously mentioned, one purpose of relief valve assemblies 126, 126' is to prevent loss of front wheel steering control due to excessively high pressures in the closed hydraulic system. Another purpose for the relief valves is to maintain a positive fluid pressure in both branches, thereby preventing reverse flexing of the roll type diaphragms in the pump, actuator and reservoir assemblies. The positive pressure is maintained by setting $P_{max}$ of both valves to a pressure less than $P_s$, thereby ensuring that $P_{min}$ is always positive since $P_{max}+P_{min}=P_a+P_b=P_s$ and since $P_{max}<P_s$.

Still further, the relief valve assemblies and straight cam slot end or stops $88_h$, $88_k$ provide means for establishing or re-establishing the correct positional or phase relationship between pump and actuator piston 72, 94. In the event of an out of phase condition, cam follow 108 will engage one of the straight cam stops prematurely or before the front wheels reach their maximum steering angle in one direction. Accordingly, an operator need merely turn the front wheels through their maximum steering angles with enough force to cause an overpressure condition in the branch corresponding to the premature stop engagement, whereby fluid in the overpressured branch will flow to the other branch via one of the relief valve assemblies.

The positive pressure provides a no backlash fluid link between the pump and actuator pistons regardless of the length of the path of the conduits interconnecting the pump and actuator. Further, the fluid link requires no adjustment during initial installation or subsequent repairs and also maintains precise positional relationship between the pump and actuator pistons independent of temperature changes.

A preferred embodiment of the invention has been disclosed for illustrative purposes. Many variations and modifications of the disclosed embodiment are believed to be within the spirit of the invention. The following claims are intended to cover the inventive portions of the disclosed embodiment, variations and modifications believed to be within the spirit of the invention.

What is claimed is:

1. A hydraulic system including first and second closed fluid flow branches; a pump device connected to one end of each branch and having pumping means movable to-and-fro about a neutral position for effecting to-and-fro fluid flow in the closed branches in response to to-and-fro movement of the pumping means; an actuator device connected to the other end of each closed branch and having actuating means movable to-and-fro about a neutral position in response to said fluid flow; first and second movable means allowing thermal expansion and contraction of the fluid in both branches; the improvement comprising:
 resilient means continuously biasing said first and second movable means in a direction tending to decrease the fluid volume in the closed branches for maintaining substantially equal positive fluid pressure in said branches when said pumping and actuating means are in said neutral positions.

2. The hydraulic system of claim 1, wherein said first and second movable means and said resilient means maintain the sum of the positive fluid pressures in said branches substantially constant during to-and-fro movement of said pumping and actuating means.

3. The hydraulic system of claim 1, wherein the first and second movable means are fixed together and biased in the same direction by said resilient means, and further including means restricting rapid movement of said movable means in response to rapid loss of fluid in either of said branches.

4. The hydraulic system of claim 1, further including pressure relief means connected between said branches and operative, when the pressure differential between said branches exceeds a predetermined limit, to port fluid from the higher pressure branch to the lower pressure branch.

5. The hydraulic system of claim 1, further including means selectively operative to allow relatively free fluid communication between the branches to facilitate positioning said pumping and actuating means to their respective neutral positions.

6. A steering apparatus for a wheeled vehicle having front and rear dirigible wheel assemblies, the apparatus comprising:
 first means for transmitting steering movement of a steering wheel to a front wheel steering assembly;
 second means for transmitting steering movement to a rear wheel steering assembly in response to steering movement of the front wheel steering assembly; the improvement wherein the second means comprises:
 a closed hydraulic system including first and second closed fluid flow branches; a fluid displacement device operative to effect fluid flow in both branches in response to steering movement of the front wheel steering assembly; a hydraulic actuator assembly operative to effect steering movement of the rear wheel steering assembly in response to said fluid flow; and a housing assembly including first and second closed reservoirs respectively connected in fluid communication with said first and second branches, a first movable partition disposed in an opening between adjacent portions of the reservoir chambers and sealingly separating the reservoirs against fluid communication therebetween, a second movable partition spaced from and fixed for movement with the first partition and sealing a second opening in the second reservoir, said first and second partitions respectively defining substantially equal surface areas of the first and second reservoirs, means applying a biasing force to the partitions for tending to decrease the volume of the reservoirs and for maintaining a positive pressure in both branches.

7. A steering apparatus for a wheeled vehicle having front and rear dirigible wheel assemblies; the apparatus comprising:
 first means for transmitting steering movement of a steering wheel to a front wheel steering assembly;
 second means for transmitting steering movement to a rear wheel steering assembly in response to steering movement of the front wheel assembly; the improvement wherein the second means comprises:
 a hydraulic system including first and second closed fluid flow branches; a pump device connected to one end of each closed branch and having pumping means movable to-and-fro about a neutral position for effecting to-and-fro fluid flow in the closed branches in response to to-and-fro steering movement of the front wheel steering assembly; an actuator device connected to the other end of each closed branch and having actuating means movable to-and-fro about a neutral position for effecting steering movement of the rear wheel steering assembly in response to said fluid flow; and an assembly including first and second chambers respectively connected in fluid communication with the first and second branches, first and second movable means respectively defining substantially equal surface areas of the chambers, and means biasing said surface areas in a direction tending to decrease the volume of the chambers.

8. The apparatus of claim 7, wherein the first and second movable means and biasing means of said assembly maintain substantially equal positive fluid pressures in said branches when the pumping and actuating means are in said neutral positions.

9. The apparatus of claim 8, wherein said first and second movable means and said biasing means maintain the sum of the positive fluid pressures in said branches substantially constant during to-and-fro movement of said pumping and actuating means.

10. The apparatus of claim 7, wherein the first and second movable means of said assembly are fixed together and biased in the same direction by said biasing means, and wherein said assembly further includes means restricting rapid movement of said movable means in response to rapid loss of fluid in either of said branches.

11. The apparatus of claim 7, wherein said hydraulic system includes pressure relief means connected between said branches and operative when the pressure differential between said branches exceeds a predetermined limit to port fluid from the higher pressure branch to the lower pressure branch.

12. The apparatus of claim 11, wherein said hydraulic system includes means selectively operative to allow relatively free fluid communication between the branches to facilitate positioning said pumping and actuating means to their respective neutral positions.

* * * * *

UNITED STATES PATENT AND TRADEMARK OFFICE
CERTIFICATE OF CORRECTION

PATENT NO. : 4,776,418

DATED : October 11, 1988

INVENTOR(S) : Peter S. Winckler and D. M. Preston

It is certified that error appears in the above-identified patent and that said Letters Patent is hereby corrected as shown below:

On the Title Page, insert --Item [73] Assignee: Eaton Corporation, Cleveland, Ohio-- and before Item [57, insert the following --Attorney, Agent, or Firm P. S. Rulon--.

Signed and Sealed this

Twenty-seventh Day of June, 1989

Attest:

DONALD J. QUIGG

*Attesting Officer*  *Commissioner of Patents and Trademarks*